May 29, 1951     T. NAGEL     2,555,289
METHOD OF PRODUCING CALCINED CALCAREOUS MATERIALS
Filed Oct. 8, 1949
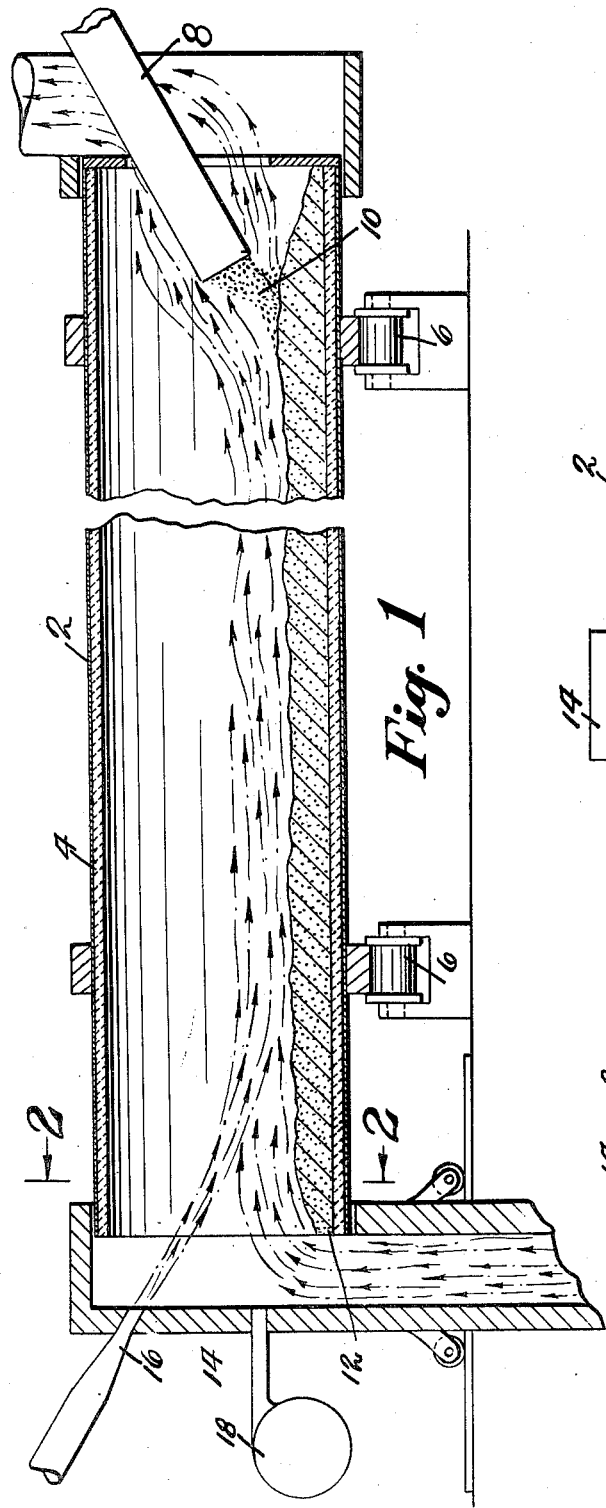
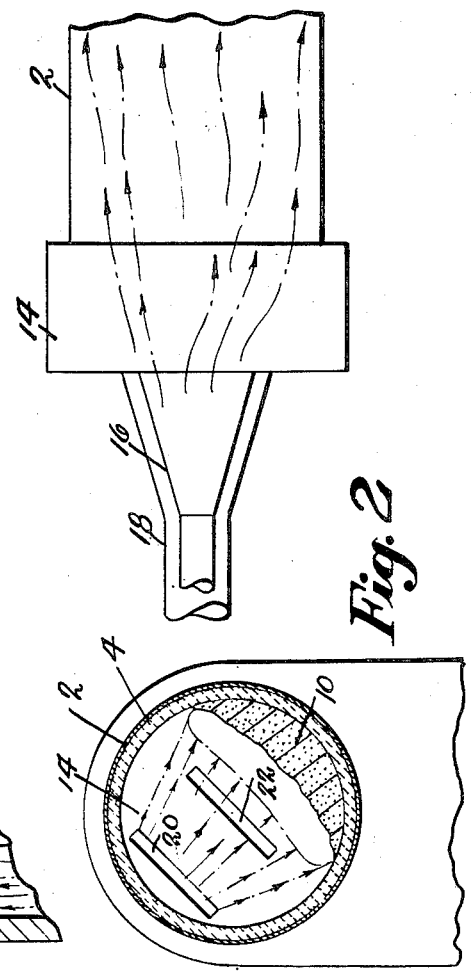
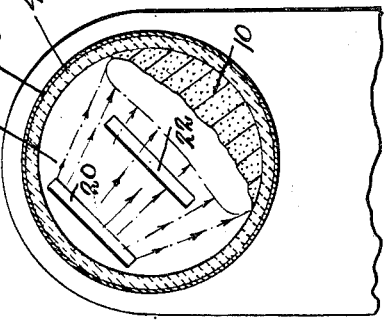
INVENTOR
THEODORE NAGEL
BY
ATTORNEY Patented May 29, 1951

2,555,289

UNITED STATES PATENT OFFICE 2,555,289

METHOD OF PRODUCING CALCINED CALCAREOUS MATERIALS

Theodore Nagel, Brooklyn, N. Y.

Application October 8, 1949, Serial No. 120,238

1 Claim. (Cl. 263—53)

My invention relates to an improved method of and apparatus for the production of cement, lime, and other calcined calcareous materials.

In the initial stages involved in the manufacture of cement and lime, the same general methods and apparatus are employed as in present practice.

The raw material, in both instances, after being reduced to a predetermined size, is fed continuously into a long rotary kiln, which is inclined slightly from the horizontal, the raw material being fed continuously into the higher end.

A fuel injection unit for oil, gas, or pulverized coal is provided at the lower or discharge end of the kiln.

As the raw material advances through the kiln due to the rotation of the kiln, the charge is subjected to the heat generated from combustion of the injected fuel, so that, by the time the charge reaches the lower end of the kiln, it has been converted to clinker in the production of cement or reduced to other finished products, such as lime for instance.

The succeeding stages of cooling and preparing for marketing will not be discussed in detail inasmuch as the same procedure may be followed as in present practice.

In its passage through the kiln, the charge of raw material must be heated to a high temperature, mainly for driving off $CO_2$. For example, the production of lime requires a temperature up to 2000° F., whereas approximately 2700° F. is required for the production of cement clinker.

Inasmuch as the kilns are necessarily massive apparatus, in some instances twelve feet in diameter and four hundred and fifty feet long, with a clinker capacity equivalent to 4,000 barrels cement per day, it will be appreciated that the daily fuel consumption is enormous.

My invention provides for a reduction in fuel consumption for a given through-put as compared with conventional practice as well as an increase in the through-put of a given-size kiln without increase in its fuel consumption. In other words, the fuel consumption necessary for the production of 4,000 barrels per day, for example, is very materially reduced when employing my improved method and apparatus, while, on the other hand, the capacity of that same kiln may be very materially increased, burning only the same quantity of fuel as consumed by present methods for the production of 4,000 barrels daily, in which case not only the fuel cost for producing the clinker per barrel of cement will be reduced, but the operating and fixed charges per barrel of cement will be lowered in approximately the same proportion.

To effect the fuel economy and also the increase in capacity referred to, I provide for an increase in the rate of heat exchange and transfer more effective heat to the charge as well, per unit of fuel burned.

The kilns, as above mentioned, are large in diameter and very long, and these rotating cylinders are made of steel, lined with firebrick. Under present practice, fuel is injected into the kiln at the discharge end and along its axis of rotation. The injected fuel bushes out on flowing forward in the kiln, producing a flame which substantially fills the space not occupied by the charge, heating the exposed surface of the charge and the exposed wall of the kiln, which latter transfers some of this absorbed heat to the charge when coming in contact with the refractory lining, but much of the heat liberated farther removed from the charge, namely, in the center of the kiln closer to and surrounding the axis of rotation of the kiln, effects a much lower rate of heat exchange to the charge than that portion of heat liberated close to the charge and, therefore, results in a substantial waste of heat.

I have devised a method of controlled heat release, which, through liberating higher temperatures and higher radiant intensity in contact with or extremely close to the moving surface of the charge, effects a higher rate of heat exchange to the charge through radiance, convection, and conduction, and transfers more effective heat per unit of fuel burned to the charge than conventional methods of heat transfer in rotary kilns, and by so doing requires less fuel for the conventional rate of cement clinker production, for example, or, when burning fuel at the same rate as used for conventional production, results in a greater capacity of clinker output. I control the flame pattern and the direction of flow of the flame regardless of the kind of fuel employed, whether oil, gas, or pulverized coal, so that the flame is confined close to the charge to obtain maximum contact of the heat release intensity with the charge.

More specifically, I provide a fuel injection unit at the lower or discharge end of the kiln which produces a relatively wide but comparatively shallow flat flame sheet. The material being treated in the kiln is dragged upwardly by the wall of the rotating kiln and, when its angle of repose is exceeded, it rolls and slides down to the bottom of the kiln, which action is simply due to the rotation of the kiln, as will be understood.

It will be appreciated also that, because the kiln is tilted slightly from the horizontal, the charge is continuously moving forward. Therefore, if a cross-section be taken through the kiln intermediate its ends, the charge would appear to be clinging to the upturning side of the kiln at a fairly steep angle of repose. In other words, the surface plane of the kiln charge will be at an angle to a horizontal plane transverse of the kiln, as clearly illustrated in Fig. 2. Accordingly, in installing my fuel injection unit, I take these facts into consideration and so install it that the plane of the wide, flat, shallow flame is at substantially the same angle to a horizontal plane transverse of the kiln as the surface plane of the kiln charge, as clearly illustrated in Fig. 2. In other words, if the surface of the charge approximates an angle of 45° to a horizontal plane transverse of the kiln, my fuel injection unit will produce a widely-spread, shallow flame the plane of which is substantially at 45° to the said horizontal plane.

It will be appreciated that, by reason of this confined and controlled flame, I will effect a much higher rate of heat release at very substantially higher temperature in contact with the charge than in conventional practice, which new method of controlled heat release transfers more effective heat per unit of fuel to the charge in less time than present methods of operation and by so doing substantially reduces the heat wasted in conventional practice.

Due to my improved method and apparatus above described, it is evident that my process can be operated to produce a substantial increase in output from the kiln with decreased fuel consumption per unit of processed material as compared with conventional methods of operation.

In the accompanying drawings,

Fig. 1 is a sectional side elevational view of a kiln employing my invention;

Fig. 2 is a section on the line 2—2 of Fig. 1; and

Fig. 3 is a fragmentary plan view.

Referring to the drawings in detail, 2 designates a steel kiln of conventional construction, lined with refractory 4. The kiln is mounted for rotation on rollers 6.

As customary, the kiln is tipped slightly from the horizontal, the high end of the kiln, as shown in the drawings, being at the right, Fig. 1, where provision is made, as seen at 8, for continuously charging the raw material 10 into the kiln.

The kiln is continuously rotated, so that the charge gradually moves toward the left hand or discharge end, continuously discharging at 12.

The discharge end of the kiln is equipped with a head 14, which is mounted on rollers, so that the head may be moved away from the kiln end when desired.

The head 14 carries a fuel injection nozzle 16, additional air supply equipment 18 being provided when desired.

It will be appreciated that, as the charge 10 of material being treated flows through the kiln, it will be dragged upwardly in the direction of rotation of the kiln and, after reaching its angle of repose, will roll and slide to the kiln bottom, so that the charge is continuously being moved not only in a direction longitudinally of the kiln but circumferentially as well. It will be seen, therefore, that, if a cross-section be taken through the kiln anywhere along its length, the charge 10 will appear as shown at 10 in Fig. 2. From this figure of the drawings, the surface of the charge is shown at an angle of approximately 45° to a horizontal plane transverse of the kiln.

Conventionally, the fuel injection unit in the kiln is located at the discharge end of the kiln, and the fuel is projected forwardly of the kiln parallel to the kiln axis. With this in mind and viewing Fig. 2 of the drawings, it will be apparent that much heat energy is wasted on flowing through the central axis area of the kiln.

By my improved method of construction and operation I increase the rate of heat transfer and the effective heat to the charge per unit of fuel. From the drawings it will be seen that the fuel injection unit 16 is directed downwardly relatively to the kiln axis, as distinguished from conventional practice, and that the discharge end of the fuel injection equipment, as shown at 20 in Fig. 2, is flattened so as to provide a slit-like discharge end the plane of which is at substantially the same angle to a horizontal plane transverse of the kiln as the plane of the surface of the charge 10. The intake for the primary air from air supply 18, if used, is also in the form of a slit, as shown at 22 in Fig. 2, this slit being below the fuel slit and parallel thereto.

By reason of the fact that the discharge end of my fuel injection unit is slit-like, as above pointed out, the slit being at substantially the same angle to a horizontal plane transverse of the kiln as the plane of the surface of the charge 10, a flat flame sheet will be produced, the surface plane of which will be at substantially the same angle as the plane of the surface of the charge 10 and, as illustrated in Fig. 2, substantially the width of the surface plane of the charge, so that the maximum in heat transfer to the charge is obtained.

The secondary air is conventionally induced to flow through the head 14 from the cooling unit (not shown), into which the material leaving the kiln is discharged, and this preheated air flows upwardly of the head and into the kiln into the spread-out stream of fuel flowing from the fuel injection unit. This arrangement for positive mixing of fuel and air produces a high rate of heat release at increased heat intensity compared with conventional methods.

It will be apparent from all of the foregoing that by my improved method and apparatus a flat blanket or sheet of flame is projected toward and confined to flow along the surface of the charge moving forward in the kiln, thereby producing a substantial increase of effective heat transfer to the charge per unit of fuel, as compared with conventional methods. This, it will be understood, will not only enable the capacity of an existing installation to be increased without increasing the fuel consumption but also will permit the fuel consumption of an installation operating at conventional capacity to be reduced with the same through-put of raw material charge.

It is to be understood that changes may be made in the details of construction and operation above set out within the purview of my invention.

What I claim is:

In the production of calcined calcareous material, the method which comprises continuously introducing the raw material which is to be treated into the higher end of an inclined rotating kiln, the rate of feed of raw material and speed of rotation of the kiln being such that the charge will be advanced along the kiln toward the lower end thereof; the charge clinging to the uprising side of the kiln so that, at any instant, the surface plane of the charge will be at an angle to a horizontal plane transverse of the kiln on the uprising side of the kiln; simultaneously with the advance of the charge producing a flat flame sheet and injecting it through the kiln counter to the direction of flow of the kiln charge, the width of the flame sheet being substantially the width of the surface plane of the charge, and the surface plane of the flat flame sheet being at substantially the same angle to the said horizontal plane transverse of the kiln on the uprising side of the kiln as the said surface plane of the kiln charge.

THEODORE NAGEL.

REFERENCES CITED

The following references are of record in the file of this patent:

UNITED STATES PATENTS

| Number  | Name    | Date          |
|---------|---------|---------------|
| 469,211 | Kline   | Feb. 16, 1892 |
| 827,517 | Ellis   | July 31, 1906 |
| 860,685 | Morgan  | July 23, 1907 |
| 897,746 | Johnson | Sept. 1, 1908 |

OTHER REFERENCES

Pages 63, 86, 122, and 123 of Trinks' Industrial Furnaces, vol. II, second edition, copyright 1942, published by John Wiley and Sons, New York, N. Y.